(12) United States Patent
Ito et al.

(10) Patent No.: US 8,137,061 B2
(45) Date of Patent: Mar. 20, 2012

(54) COOLING STRUCTURE FOR WORKING VEHICLE

(75) Inventors: Shinichiro Ito, Tochigi (JP); Shinichi Katou, Tochigi (JP); Takushi Kawakami, Tochigi (JP)

(73) Assignee: Komatsu Utility Co., Ltd., Oyama-shi (JP)

( * ) Notice: Subject to any disclaimer, the term of this patent is extended or adjusted under 35 U.S.C. 154(b) by 692 days.

(21) Appl. No.: 12/295,047

(22) PCT Filed: Mar. 27, 2007

(86) PCT No.: PCT/JP2007/056387
§ 371 (c)(1),
(2), (4) Date: Jan. 8, 2009

(87) PCT Pub. No.: WO2007/111332
PCT Pub. Date: Oct. 4, 2007

(65) Prior Publication Data
US 2009/0272341 A1 Nov. 5, 2009

(30) Foreign Application Priority Data

Mar. 29, 2006 (JP) .................................. 2006-091209
Mar. 2, 2007 (JP) .................................. 2007-052832

(51) Int. Cl.
*F01P 5/06* (2006.01)
*F28F 13/06* (2006.01)
*F28F 9/00* (2006.01)

(52) U.S. Cl. .................... 415/182.1; 123/41.49; 165/67; 165/121

(58) Field of Classification Search ............... 415/182.1; 123/41.49; 165/121, 67
See application file for complete search history.

(56) References Cited

U.S. PATENT DOCUMENTS

| 2005/0081803 A1 | 4/2005 | Yoshimatsu et al. | ........ 123/41.65 |
| 2007/0160468 A1* | 7/2007 | Tsubota | ..................... 415/173.6 |

FOREIGN PATENT DOCUMENTS

| JP | 58-057523 | 4/1983 |
| JP | 58-174114 | 10/1983 |
| JP | 60-090919 | 5/1985 |

(Continued)

OTHER PUBLICATIONS

Communication from the Japanese Patent Office mailed May 24, 2011 with English translation (3 pages).

(Continued)

*Primary Examiner* — David S Blum
(74) *Attorney, Agent, or Firm* — Katz, Quintos & Hanson, LLP

(57) ABSTRACT

A cooling structure for a working vehicle in which a shroud is attached to a radiator provided to a vehicle body, and an air-cooling fan is made face to an airflow opening of the shroud, wherein the shroud comprises a shroud body attached to the radiator, and an opening member having the airflow opening, and further comprises securing means capable of fixing the opening member to the shroud body, and of freely adjusting a fixing position of the opening member with respect to the shroud body, and a relative position between the air-cooling fan and the airflow opening of the shroud is made freely adjustable. With the configuration above, the sufficient amount of heat radiated by the radiator can be obtained without causing the disadvantages such as increased noise.

3 Claims, 16 Drawing Sheets

FOREIGN PATENT DOCUMENTS

| | | |
|---|---|---|
| JP | 6-33764 | 5/1994 |
| JP | 2004-270648 | 9/2004 |
| JP | 2005-69098 | 3/2005 |
| WO | WO 2005/098213 A1 | 10/2005 |

OTHER PUBLICATIONS

CD-ROM of the specification and drawings annexed to the request of Japanese Utility Model Application No. 093761/1992 (Laid-open No. 053722/1994) (Toyo Radiator Co., Ltd.), Jul. 22, 1994.

CD-ROM of the specification and drawings annexed to the request of Japanese Utility Model Application No. 069288/1992 (Laid-open No. 034132/1994) (Calsonic Corp.), May 6, 1994.

Microfilm of the specification and drawings annexed to the request of Japanese Utility Model Application No. 106165/1981 (Laid-open No. 012628/1983).

Supplementary European Search Report of Oct. 19, 2010.

\* cited by examiner

COOLING STRUCTURE FOR WORKING VEHICLE

TECHNICAL FIELD

The present invention relates to a cooling structure for a working vehicle in which a shroud is attached to a radiator provided in a vehicle body; and an air-cooling fan for an engine provided in a vehicle body is made face to an airflow opening provided to the shroud.

BACKGROUND ART

For a forklift (forklift truck) A as shown in FIGS. 14 and 15, which is one mode of a working vehicle, a vehicle body B and a work equipment W installed in front of the vehicle body B are provided. Within the vehicle body B, there provided an engine E, a radiator R and other units.

Here, to increase cooling efficiency of the radiator, there has been provided a cooling system (cooling structure) in which a shroud is attached to the radiator to concentrate cooling air (see, for example, Patent Literature 1).

In other words, in the forklift A shown in FIGS. 14 and 15, a shroud S having an airflow opening So is attached in front of the radiator R, and an air-cooling fan F supported by the engine E is made face to the airflow opening So of the shroud S.

With the cooling system described above, outside air drawn from the front, under sides, etc. of the vehicle body B by the air-cooling fan F in operation is introduced from the airflow opening So into the inside of the shroud S, and is collectively directed to the radiator R while being guided by the shroud S. This enables the radiator R above to be efficiently cooled.

Patent Literature 1: Japanese Patent Application Laid-open No. 58-174114

DISCLOSURE OF THE INVENTION

Problems to be Solved by the Invention

Incidentally, in the conventional forklift A as described above, the engine E is floatingly supported by the vehicle body B via a rubber mount or other anti-vibration member for the purpose of improving the vibration and noise occurring at the time of its operation.

As a result, the engine E above may roll due to torque occurring at the time of starting or sudden application of load. Thus, in the cooling system for the forklift A as described above, as shown in FIG. 16, a clearance a is provided between the air-cooling fan F (fan blade Fb) supported by the engine E and the airflow opening So of the shroud S to prevent both of them from colliding.

In other words, in the conventional cooling system for the forklift A, a large space is required for a clearance c (tip clearance) between the airflow opening So of the shroud S and the air-cooling fan F (fan blade Fb), in which a clearance b for allowing "variations" in the installation position between the shroud S and the air-cooling fan F is added to the above-described clearance a provided for the purpose of preventing both of them from colliding.

As described above, in the conventional cooling system, the efficiency of supplying the cooling air to the shroud S by the air-cooling fan F is impaired because of the large clearance c formed between the airflow opening So of the shroud S and the air-cooling fan F, which results in a decrease in the amount of heat radiated (amount of heat for cooling) by the radiator R. This leads to a large noise because the number of revolutions of the air-cooling fan F is increased to compensate the decrease in the amount of heat. Alternatively, if the number of revolutions of the air-cooling fan is not increased, a cooling system having the large amount of heat radiation is necessary. This requires a larger space for installation, and thus results in an increase in the cost of the cooling system.

The present invention has been made in view of the above circumstances and has an object to provide a cooling structure for a working vehicle, which can obtain the sufficient amount of heat radiation by the radiator without causing disadvantages such as increased noise.

Means to Solve the Problems

To achieve the object above, a first aspect of the present invention provides a cooling structure for a working vehicle, in which a shroud is attached to a radiator provided to a vehicle body, and an air-cooling fan is made face to an airflow opening of the shroud, wherein the shroud comprises a shroud body attached to the radiator, and an opening member having the airflow opening, and further comprises securing means capable of fixing the opening member to the shroud body, and of freely adjusting a fixing position of the opening member with respect to the shroud body, and a relative position between the air-cooling fan and the airflow opening of the shroud is made freely adjustable.

A second aspect of the present invention provides the cooling structure for the working vehicle according to the first aspect of the present invention, wherein the securing means of the shroud comprises: a securing mechanism having a bolt screwed into the shroud body, and a large-diameter attachment hole formed to the opening member through which the bolt is loosely fitted; and a securing mechanism having an attachment tongue formed to one of the shroud body and the opening member, and a hook formed to the other one of the shroud body and the opening member to engage the attachment tongue.

A third aspect of the present invention provides the cooling structure for the working vehicle according to the second aspect of the present invention, wherein the hook constituting the securing means is provided with a pressure protrusion that is pressure-contacted with the attachment tongue in a state where the attachment tongue is engaged with the hook.

A fourth aspect of the present invention provides the cooling structure of the working vehicle according to the first aspect of the present invention, wherein a strengthening rib is formed to the opening member to improve rigidity of the opening member.

Effects of the Invention

According to the cooling structure for the working vehicle of the first aspect of the present invention, since the "variations" in the installation position between the shroud and the air-cooling fan are cancelled out to "zero" by making a fixing position of an opening member with respect to a shroud body freely adjustable, a clearance between an airflow opening of the shroud and the air-cooling fan can be made as small as possible, provided that collision between them can be prevented. As a result, the sufficient amount of heat radiation by the radiator can be obtained or capacity of the radiator can be reduced without increasing the rotation number of the air-cooling fan, in other words, without causing the disadvantages such as increased noise.

According to the cooling structure for the working vehicle of the second aspect of the present invention, since the securing means of the shroud is formed by the securing mechanism comprising the bolt and the large-diameter attachment hole through which the bolt is loosely inserted, and the securing mechanism comprising the attachment tongue and the hook for engaging the attachment tongue, the operation related to the position adjustment of the opening member with respect to the shroud body can be extremely easily performed.

According to the cooling structure for the working vehicle of the third aspect of the present invention, since the pressure protrusion is formed to the hook of the securing means, the opening member is maintained by the shroud body when the attachment tongue is engaged with the hook, whereby the operation related to the position adjustment of the opening member with respect to the shroud body can be extremely easily performed.

According to the cooling structure for the working vehicle of the fourth aspect of the present invention, since the strengthening rib is formed to improve rigidity of the opening member, deformation of the opening member 12 caused, for example, by the increase in the internal pressure of the shroud 10 due to the inflow of the cooling air can be limited, whereby the decrease in the amount of heat radiated by the radiator due to the leakage of the cooling air can be prevent in advance.

Figure 1:
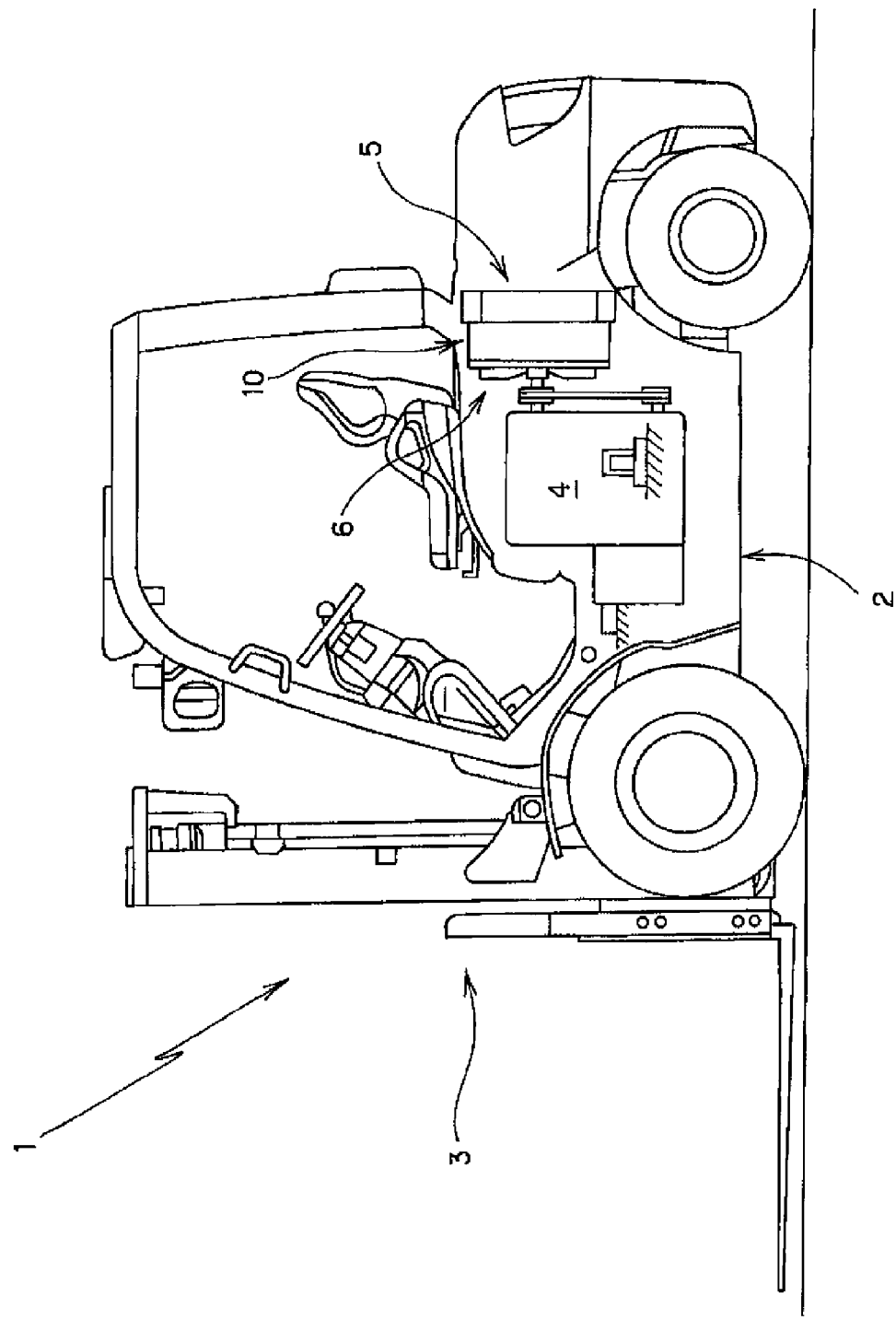
FIG. 1 is a conceptual view showing a layout of an engine, a radiator, etc. in a working vehicle to which a cooling structure according to the present invention is applied.

EXPLANATION OF REFERENCE NUMERALS 1 forklift (working vehicle)
2 vehicle body
4 engine
5 radiator
6 air-cooling fan
10 shroud
11 shroud body
11s, 11m hook
11t pressure protrusion
12 opening member
12o airflow opening
12h attachment hole
12s, 12m tongue
12r strengthening rib
20 bolt
30 tree clip

BEST MODE FOR CARRYING OUT THE INVENTION

Hereinafter, the present invention will be described in detail on the basis of the drawings illustrating embodiments.

Figure 2:
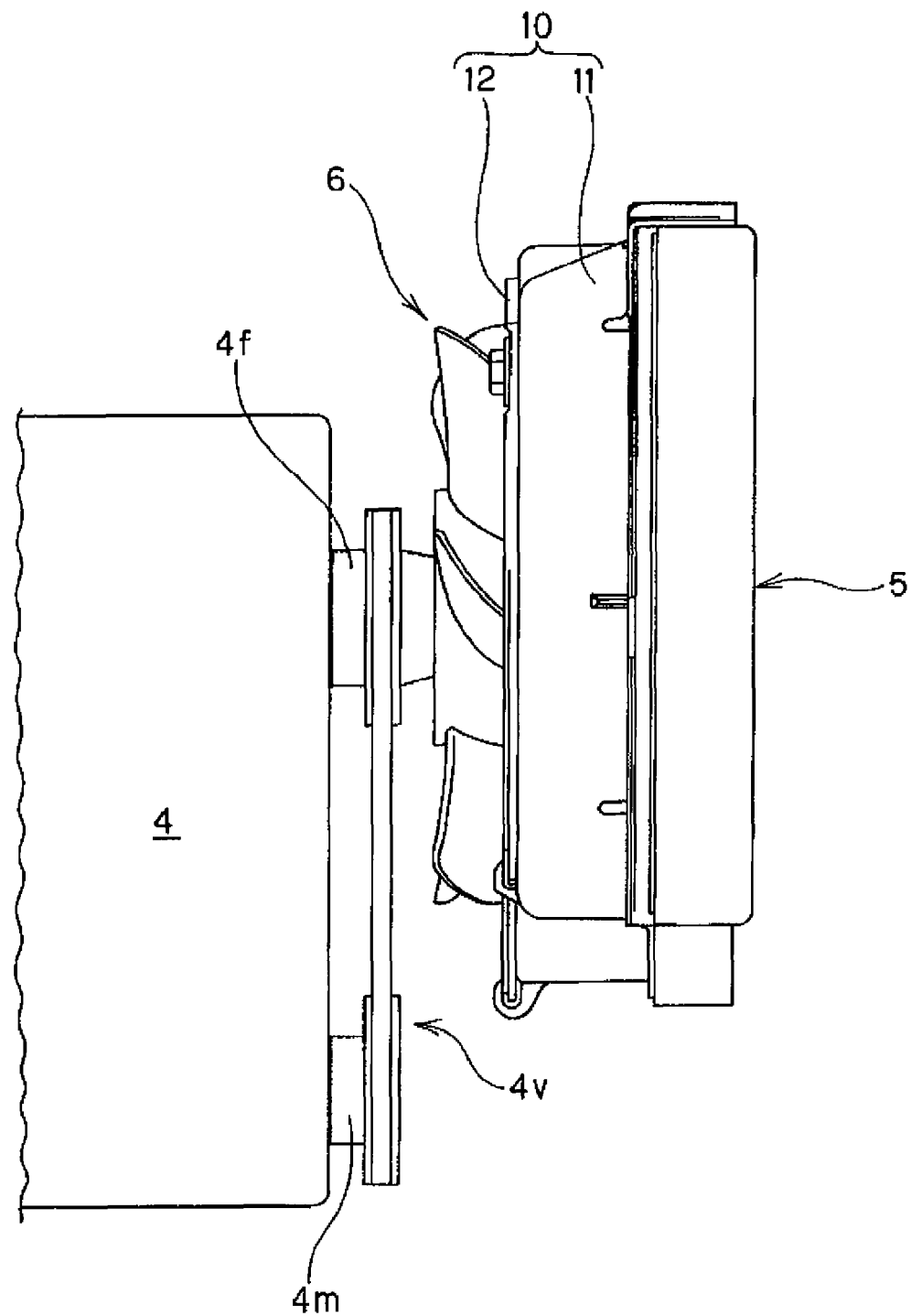
FIG. 2 is a main portion side view showing the cooling structure in the working vehicle shown in FIG. 1.

FIGS. 1 and 2 show an example in which the present invention is applied to a forklift, which is one mode of the working vehicle. This forklift 1 has a vehicle body 2 and a working equipment 3 provided in front of the vehicle body 2.

Inside the vehicle body 2 above, an engine 4 and a radiator 5 are provided. The engine 4 above is floatingly supported in an approximate center area of the vehicle body 2 via a rubber mount or other anti-vibration members. The radiator 5 is installed in a rear area of the engine 4 via appropriate anti-vibration means.

To the rear of the engine 4, an air-cooling fan 6 is rotatably supported via a fan shaft 4f, Since the fan shaft 4f above is connected with a main drive shaft (output shaft) 4m via a transmission mechanism 4v, the air-cooling fan 6 above is driven and rotated as the engine 4 operates.

To the front area of the radiator 5 above and the rear area of the air-cooling fan 6, there provided a shroud 10 for collecting and guiding a cooling air supplied by the air-cooling fan 6 to the radiator 5. The cooling system (cooling structure) is formed by the engine 4, the air-cooling fan 6, the radiator 5, the shroud 10, etc. as described above.

Figure 3:
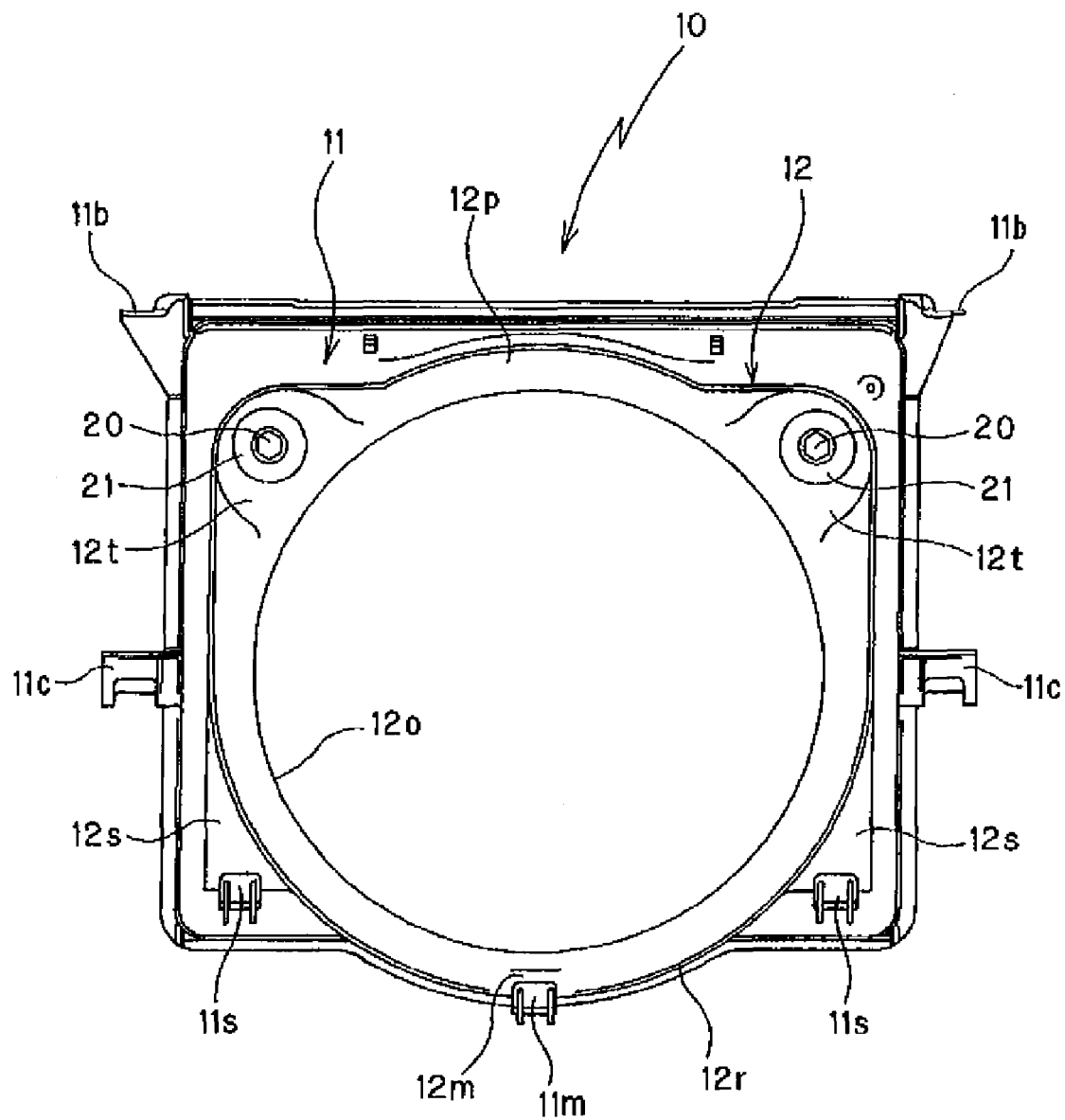
FIG. 3 is a front view showing an overall shroud constituting the cooling structure shown in FIG. 1.

As shown in FIGS. 2 and 3, the shroud 10 above is provided with a shroud body 11 fixedly installed to a front surface side of the radiator 5 (left side in FIG. 2), and an opening member 12 attached to a front surface side of the shroud body 11 (left side in FIG. 2). The opening member 12 is attached to the shroud body 11 by securing means, which will be described later, such that its fixing position is freely adjustable. Incidentally, the shroud body 11 and the opening member 12 are formed of a plastic material or metallic material.

Figure 4A:
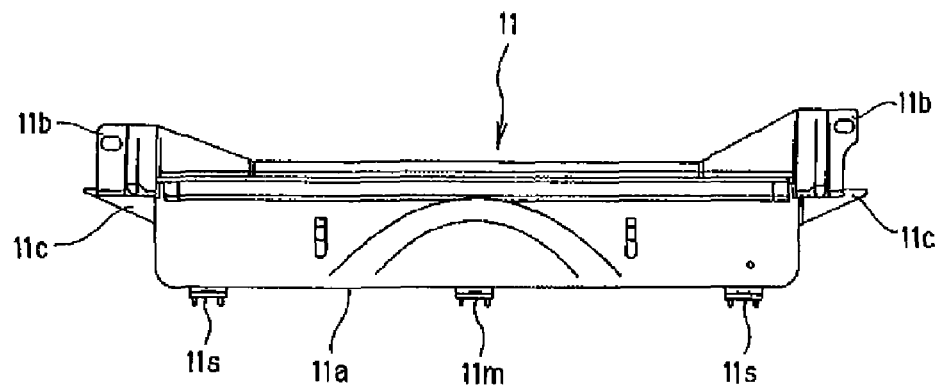
FIGS. 4A and 4B are a plan view and a front view showing a shroud body of the shroud shown in FIG. 3.
Figure 4B:
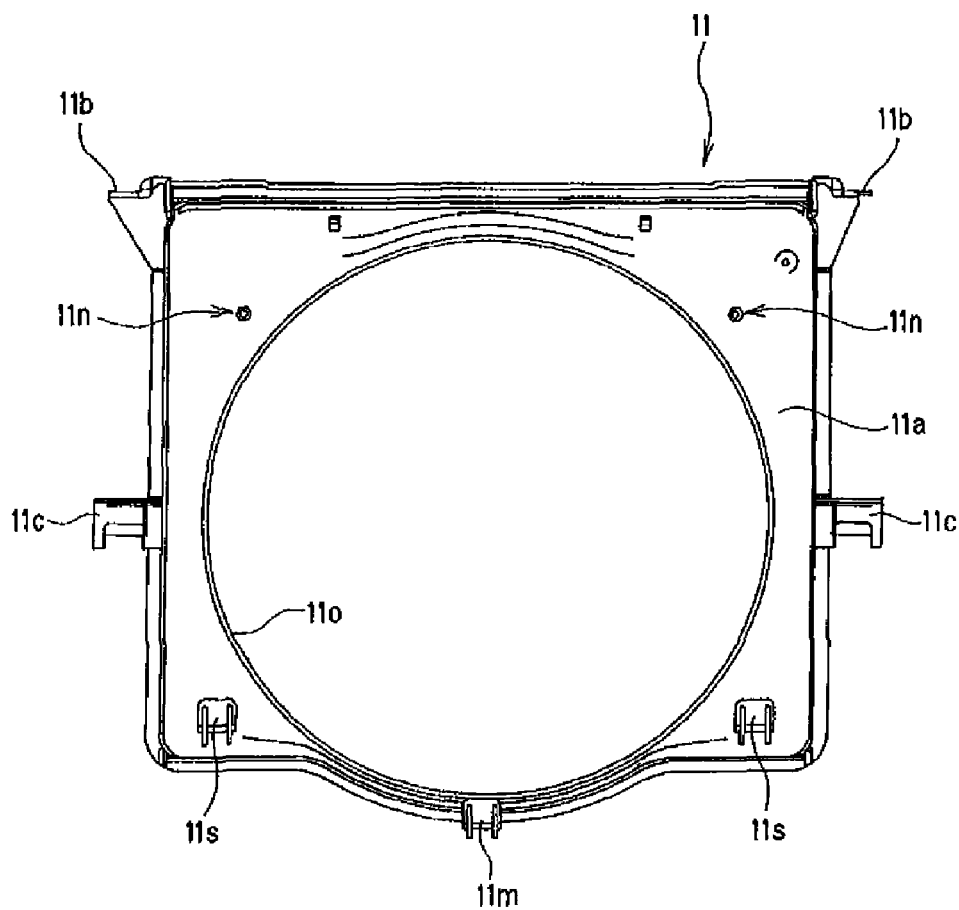
Figure 5A:
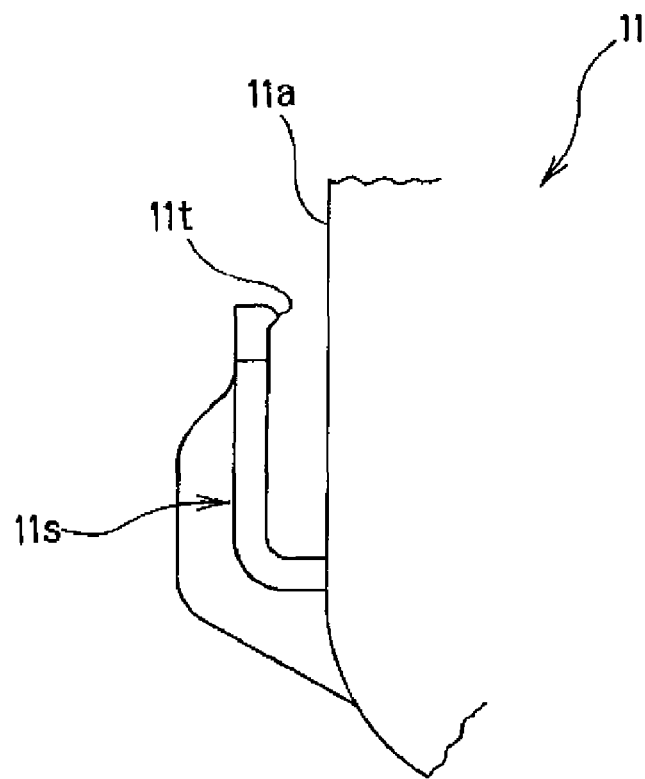
FIGS. 5A and 5B are main item side views showing hooks of the shroud body shown in FIG. 4.
Figure 5B:
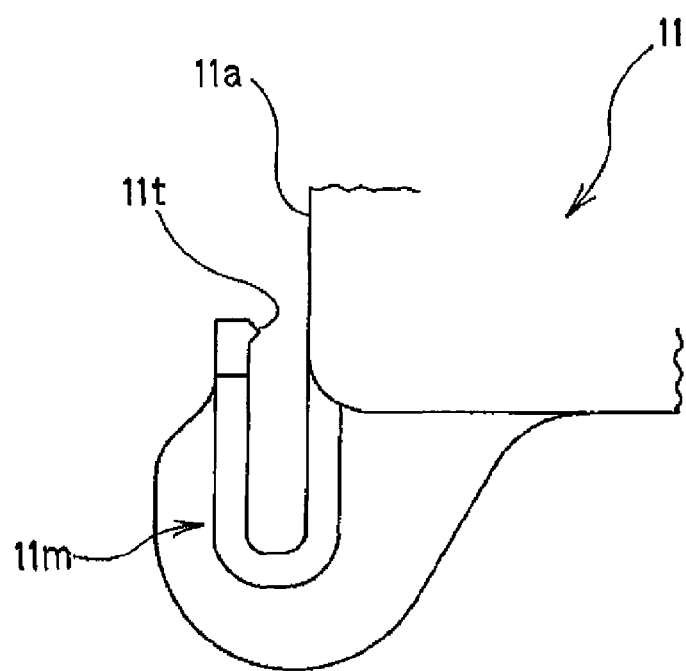

As shown in FIGS. 4 and 5, the shroud body 11 has a rectangular and box-like shape in which a portion facing to the front surface of the radiator 5 is opened. A large-diameter assembly opening 11o is formed in a center area of a front side plane 11a of the shroud body 11. Brackets 11b, 11c used for attaching to the radiator 5 are formed to a right and a left edge portions of the rear side.

Additionally, nuts 11n, 11n are each provided fixedly to each of a right and a left corners of an upper part of the front side plane 11a of the shroud body 11. Those nuts 11n are fixed to the front side plane 11a in such a manner as integral molding, and are formed to be flush with a surface of the front side plane 11a.

Furthermore, hooks 11s, 11s are each formed to each of a right and a left areas of a lower part of the front side plane 11a of the shroud body 11 above, while a hook 11m is formed to a lower center of the front of the shroud body 11 above. As shown in FIG. 5, a pressure protrusion 11t is formed to each of the resilient tongue hooks 11s above and the resilient tongue hook 11m above such that the pressure protrusion 11t faces to the front side plane 11a.

Figure 6A:
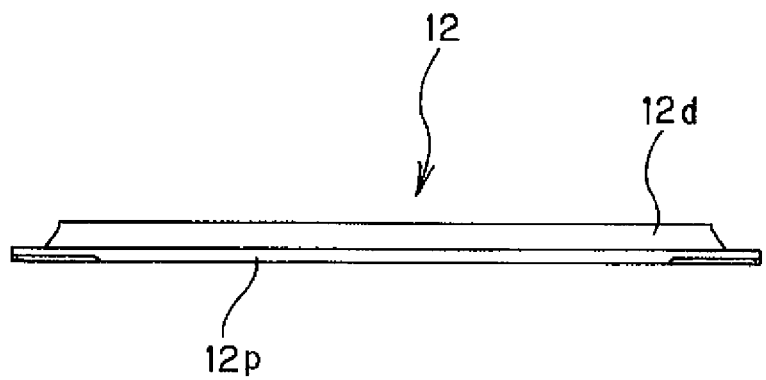
FIGS. 6A and 6B are a plan view and a front view showing an opening member of the shroud shown in FIG. 3.
Figure 6B:
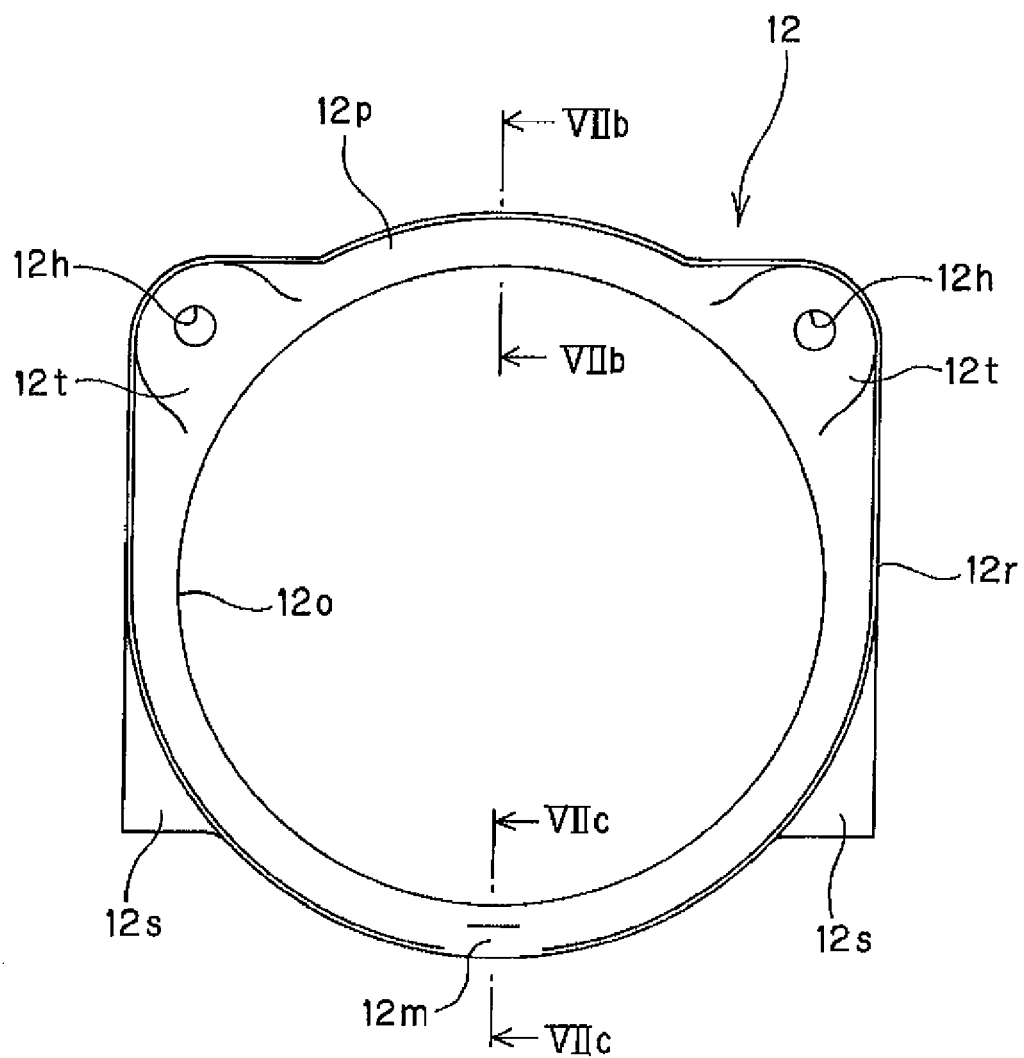
Figure 7A:
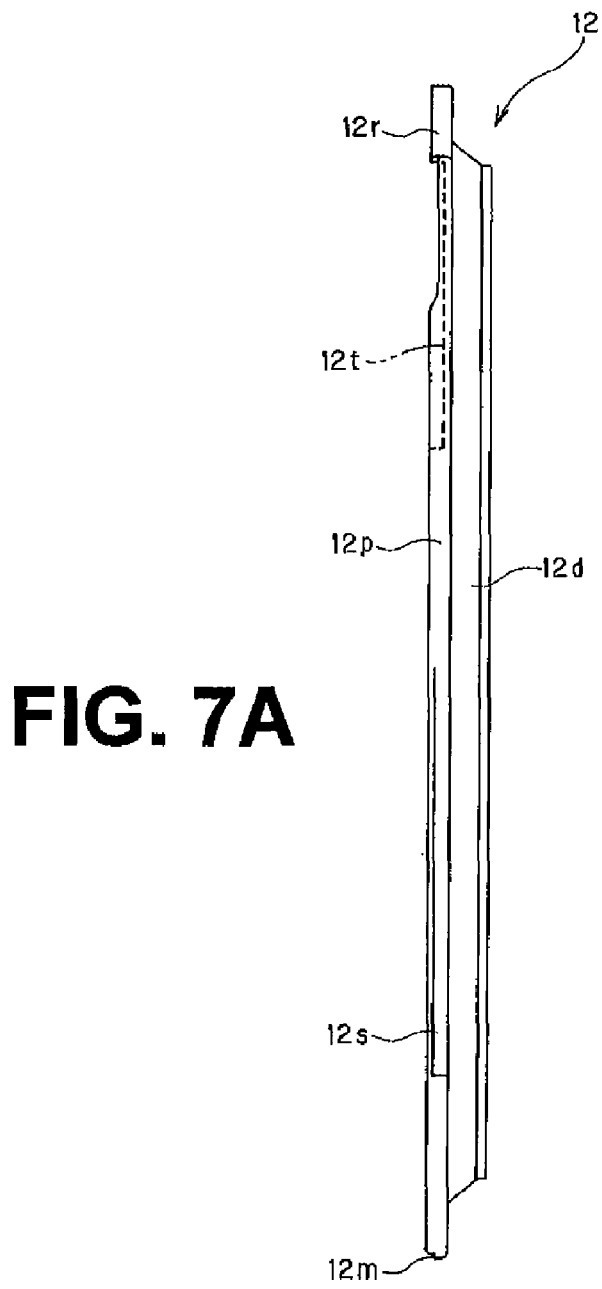
FIG. 7A is a side view of the opening member shown in FIG. 6.
Figure 7B:
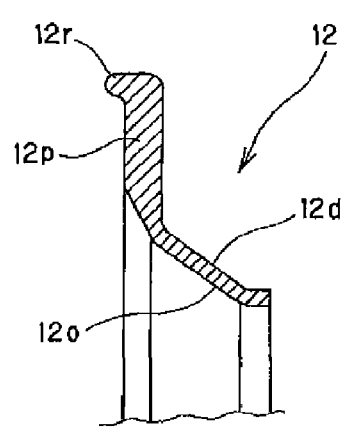
FIG. 7B is a sectional view taken along the line VIIb-VIIb of FIG. 6.
Figure 7C:
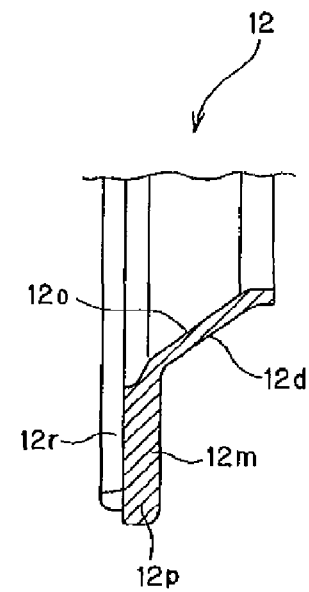
FIG. 7C is a sectional view taken along the line VIIc-VIIc of FIG. 6.

Additionally, as shown in FIGS. 6 and 7, the opening member 12 above has a front side plane 12p that is closely contacted and attached to the front side plane 11a of the shroud body 11, and a duct portion 12d fitted into the assembly opening 11o of the shroud body 11. In a central area of the front side plane 12p above, an airflow opening 12o is demarcated by an inner periphery surface of the duct portion 12d.

Additionally, attachment flanges 12t, 12t are each provided to each of a right and a left corners of an upper portion of the front side plane 12p of the opening member 12. Large-diameter attachment holes 12h, 12h are each formed penetratingly to each of the attachment flanges 12t, 12t at a position corresponding with each of the positions of the nuts 11n, 11n in a state where the opening member 12 is attached to the shroud body 11.

Here, each of the attachment holes 12h, 12h is formed such that a bolt 20 (see FIG. 8), which is screwed to the nut 11n of the shroud body 11, can be penetrated through. The inner diameter of the center hole of the attachment holes 12h is formed much larger than an outer diameter of a shaft portion of the bolt 20 above.

Additionally, attachment tongues 12s, 12s are each formed to each of a right and a left portions of a lower part of the front side plane 12p of the opening member 12 above. To a center of a lower part of the front side plane 12p, an attachment tongue 12m is formed.

Here, each of the attachment tongues 12s, 12s is formed at a position where it is engaged with each of the hooks 11s, 11s above in a state where the opening member 12 is attached to the shroud body 11. The attachment tongue 12m is formed at a position where it is engaged with the hook 11m of the shroud body 11 above.

Additionally, to improve rigidity of the opening member 12, a strengthening rib 12r forwardly protruding is formed to the opening member 12 in a manner that the rib 12r surrounds the airflow opening 12o, and the right and left attachment flanges 12t, 12t.

Figure 8:
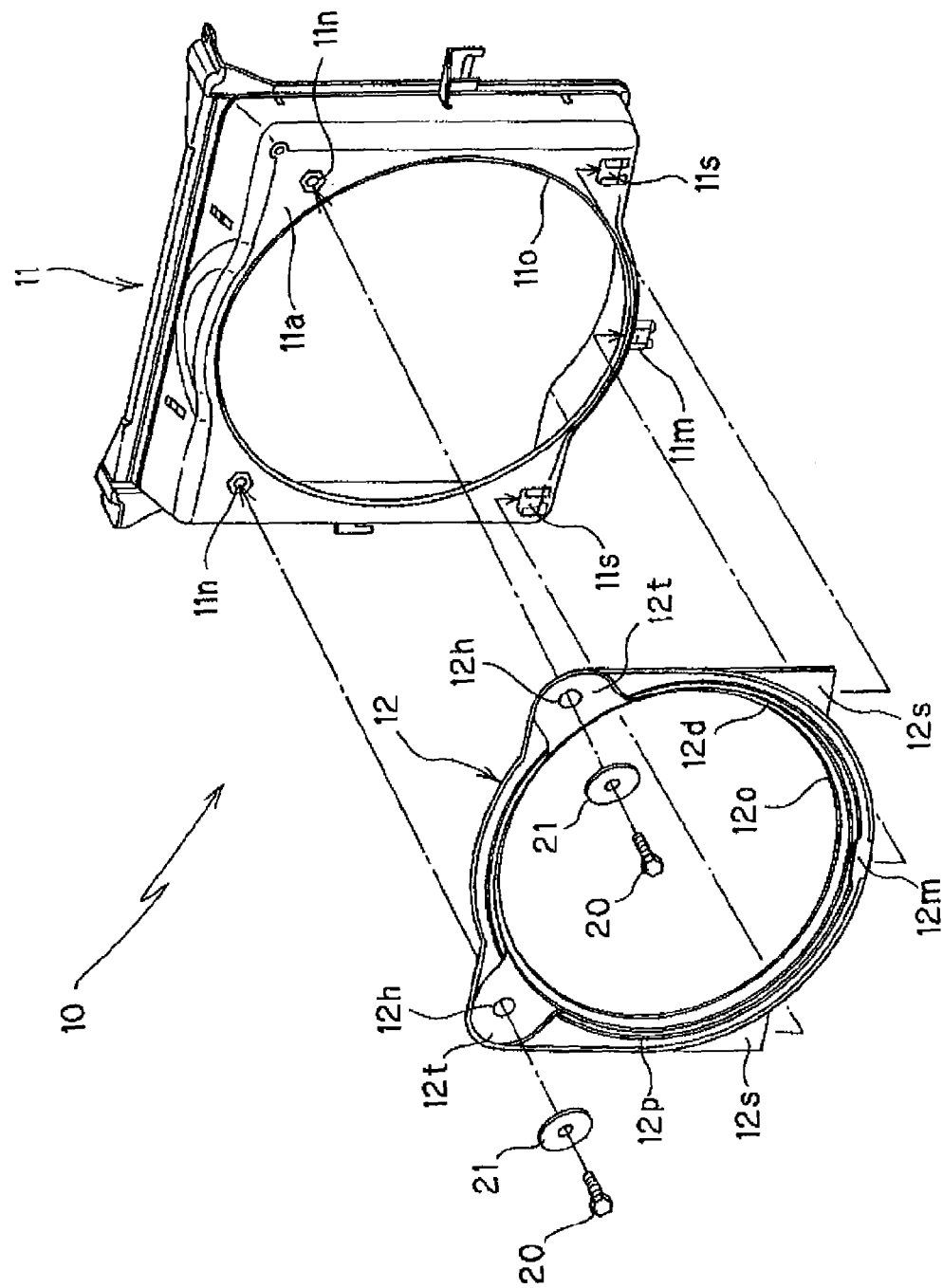
FIG. 8 is an exploded perspective view showing the shroud shown in FIG. 3 before the shroud is assembled.

As shown in FIG. 8, in the shroud 10 having the configuration previously discussed, the opening member 12 is secured to the shroud body 11 by inserting the bolt 20 equipped with a washer 21 through each of the attachment holes 12h of the opening member 12; screwing the bolt 20 above to each of the nuts 11n of the shroud body 11 to fasten; making each of the attachment tongues 12s of the opening member 12 engage with each of the hooks 11s of the shroud body 11; and making the attachment tongues 12m of the opening member 12 engage with the hook 11m of the shroud body 11.

In other words, the shroud body 11 and the opening member 12, both of which constitute the shroud 10, are mutually fixed by using securing means comprising a first securing mechanism comprising the nut 11n of the shroud body 11, the large-diameter attachment hole 12h of the opening member 12, and the bolt 20 equipped with the washer 21, and a second securing mechanism comprising the hooks 11s, 11m of the shroud body 11, and the attachment tongues 12s, 12m of the opening member 12.

Figure 9A:
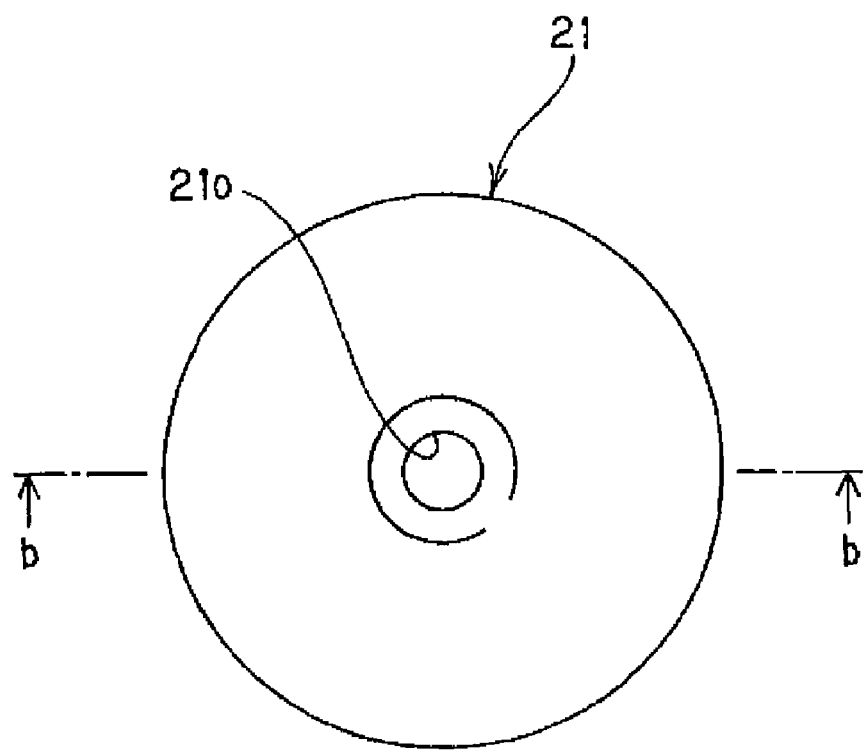
FIGS. 9A and 9B are a plan view and a sectional view showing a washer used for assembling the shroud.
Figure 9B:
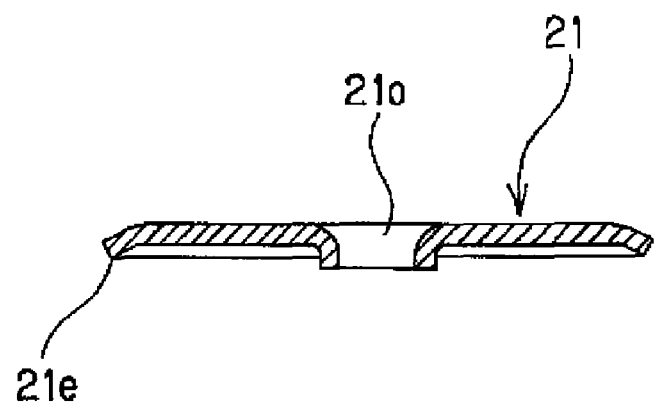

Here, as shown in FIG. 9, the washer 21 provided to the bolt 20 has a larger diameter than the attachment hole 12h of the opening member 12, and has, at its center, a through hole 21o that is slightly larger than the shaft portion of the bolt 20, and an edge portion 21e on a backside and a periphery of the washer 21 bites the attachment flange 12t when the bolt 20 above is screwed to fasten, whereby the opening member 12 is securely fixed.

Additionally, in a state where the attachment tongues 12s and the attachment tongue 12m of the opening member 12 are engaged with the hooks 11s and the hook 11m of the shroud body 11, the pressure protrusions 11t formed to the hooks 11s and the hook 11m apply pressure on the attached tongues 12s and the attached tongue 12m. This makes sure that the opening member 12 is maintained to the shroud body 11.

Furthermore, the securing means comprising the first securing mechanism and the second securing mechanism is capable of fixing the opening member 12 to the shroud body 11 as describe above, while making it possible to freely adjust the fixing position of the opening member 12 with respect to the shroud body 11.

In other words, the attachment hole 12h of the opening member 12, which constitutes the first securing mechanism, is much larger than the outer diameter of the shaft portion of the bolt 20 that penetrates the attachment hole 12h and is screwed to the nut 11n of the shroud body 11. Thus, by loosening the bolt 20 above, the fixing position of the opening member 12 can be adjusted with respect to the shroud body 11, for example, in a range of about 10 mm in all directions including top, bottom, right, and left directions.

Here, since the attachment tongue 12s and the attachment tongue 12m, which constitute the second securing mechanism, are held only by the hook 11s and the hook 11m, the opening member 12 can be moved in up, bottom, right and left directions with respect to the shroud body 11. Accordingly, it is possible to adjust the fixing position of the opening member 12 with respect to the shroud body 11.

In the cooling system having the configuration as described above, the outside air drawn from the front and under sides of the vehicle body 2 by the air-cooling fan 6 in operation is introduced into the shroud body 11 through the airflow opening 12o of the opening member 12 in the shroud 10, and is collectively directed to the radiator 5 while being guided by the shroud body 11, whereby the radiator R can be efficiently cooled.

Additionally, in the cooling system having the configuration as describe above, since the fixing position of the opening member 12 is made freely adjustable with respect to the shroud body 11, the "variations" in the attachment position between the shroud and the air-cooling fan can be cancelled out to "zero."

Figure 10:
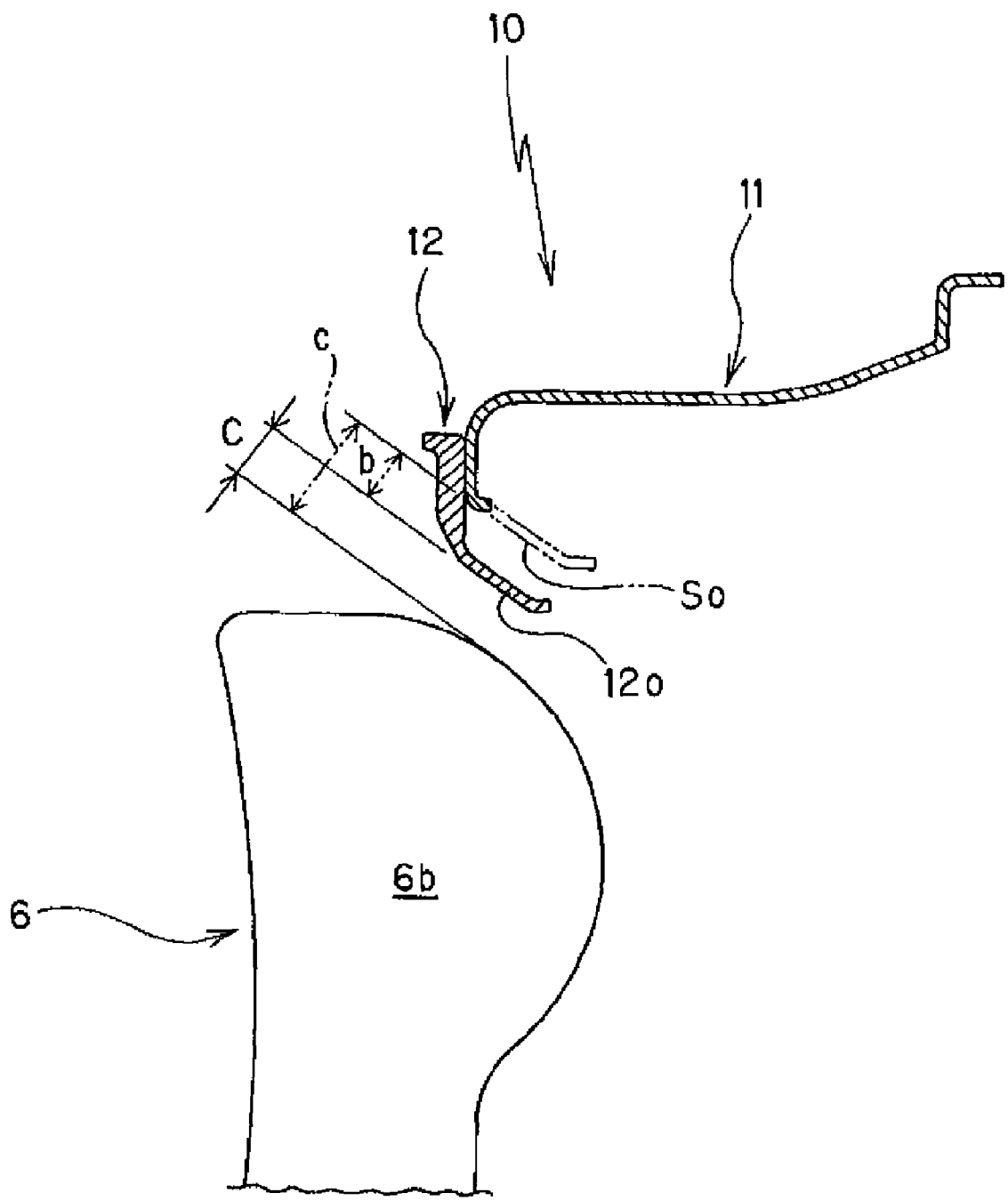
FIG. 10 is a main portion sectional view showing a positional relationship between a cooling fan and the shroud that constitute the cooling structure shown in FIG. 1.

In other words, as shown in FIG. 10, in the conventional cooling system, a large clearance, including the clearance b for allowing the "variations" in the attachment position, is required for the clearance (tip clearance) c between an air-cooling fan, for example, having a diameter of 400 mm and an airflow opening So, while, in the cooling system according to the embodiment of the present invention, the clearance (tip clearance) C between the airflow opening 12o of the shroud 10 and the air-cooling fan 6 (fan blade 6b) can be made as small as possible, for example, with about 10 mm, provided that the collision of both of them due to engine's behavior can be prevented.

As a result, in the cooling system having the configuration as described above, the decrease in the efficiency of supplying the cooling air due to the large tip clearance, and the deterioration in the amount of heat (amount of heat for cooling) radiated by the radiator 5 can be prevented in advance. Accordingly, the sufficient amount of heat radiation by the radiator 5 can be obtained without increasing the rotation number of the air-cooling fan 6 to compensate the decrease in the amount of heat, in other words, without causing the disadvantages such as increased noise or deterioration in fuel efficiency.

Additionally, with the shroud 10 constituting the cooling system as described above, since the clearance C between the air-cooling fan 6 and the airflow opening 12o can be adjusted equally over the entire perimeter of both of the air-cooling fan 6 and the airflow opening 12o, it becomes possible to further increase the amount of radiation by the radiator 5 by improving the efficiency of supplying the cooling air to the shroud 10.

Additionally, in the shroud 10 of the cooling system as described above, since the rigidity is strengthened by forming the strengthening rib 12r to the opening member 12, deformation of the opening member 12 caused by the increase in the internal pressure of the shroud 10 due to the inflow of the cooling air can be limited. This prevents the leakage of the cooling air from the assembled portion between the shroud body 11 and the opening member 12, whereby the accidental decrease in the amount of heat radiated by the radiator 5 can be prevented in advance.

Thus, as shown and described, the cooling structure includes a first securing mechanism, arranged to secure the opening member to the shroud, having a bolt screwed into the shroud body, and a large-diameter attachment hole formed to the opening member through which the bolt is loosely inserted, and a second securing mechanism, arranged to secure the opening member to the shroud, having an attachment tongue formed to one of the shroud body and the opening member, and a hook formed to the other one of the shroud body and the opening member to engage the attachment tongue, such that a relative position between the air-cooling fan and the airflow opening of the shroud is made freely adjustable.

Here, at the time of mounting the shroud 10 constituting the cooling system as described above to the vehicle body 2, the shroud body 11 of the shroud 10 is attached to the radiator 5, while the opening member 12 is attached to the shroud body 11 above through the securing means, and is temporarily jointed using the bolt 20.

Next, after the radiator 5 above is mounted and fixed to the vehicle body 2 that has already floatingly supported the engine 4, the position of the opening member 12 (airflow opening 12o) with respect to the cooling fan 6 (fan blade 6b) is determined by using an appropriate jig that employs as the reference position the fan shaft 4f of the engine 4. Finally, by firmly fastening the bolt 20, the opening member 12 is fixed to the shroud body 11 and is made immobilized.

As described above, in the cooling system having the configuration as described above, the securing means of the shroud 10 is formed by the first securing mechanism comprising the bolt 20 and the large-diameter attachment hole 12h, and the second securing mechanism comprising the hooks 11s, 11m and the attachment tongues 12s, 12m. As a result, the operation related to the position adjustment of the opening member 12 with respect to the shroud body 11 can be easily performed because it becomes unnecessary to hold the lower part of the shroud.

Additionally, the first securing mechanism comprising the bolt 20 is employed to the upper side portion of the shroud 10 forming the cooling system as described above. As a result, the operation related to the positional adjustment and fixing of the opening member 12 to the shroud body 11 can be easily performed from the upper side where wide-open space is available for access.

Furthermore, with the shroud 10 constituting the cooling system as described above, since the pressure protrusion 12t is formed to each of the hooks 12s, 12m of the second securing mechanism, the opening member 12 is maintained by the shroud body 11 in a state where the hook is engaged with the attachment tongue. This prevents the opening member 12 from accidentally moving during the position determination with the jig, whereby the operation related to the position adjustment of the opening member 12 with respect to the shroud body 11 becomes significantly easy.

It should be noted that, in the shroud 10 as described above, which is given as an embodiment, two first securing mechanisms comprising the bolts and the large-diameter attachment holes are each provided to each of the left and right portions of the upper portion, and three second securing mechanisms comprising the hooks and attachment tongues are provided to the lower part. However, it is understood that it may be possible to optionally decide the number of installation and the installation position of each of the securing mechanisms on the basis of the specifications of the shroud as well as the forklift or other conditions.

Additionally, in the embodiment as described above, the first securing mechanism comprising the bolts and the large-diameter attachment holes, and the second securing mechanism comprising the hooks and the attachment tongues are employed as the securing means for fixing the opening member to the shroud body in a manner that the position is freely adjustable. However, it is needless to say that the various existing securing mechanisms may be employed as the securing means.

Figure 11:
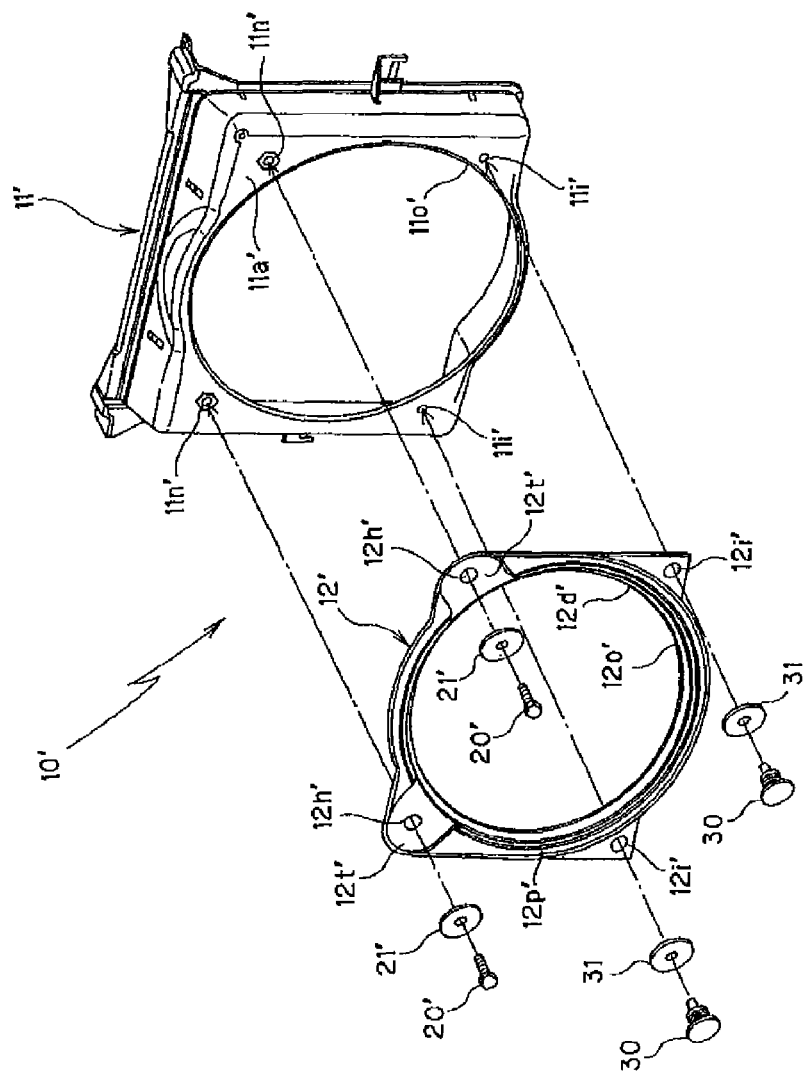
FIG. 11 is an overall exploded perspective view showing the shroud before assemble illustrating another embodiment of the cooling structure in the working vehicle according to the present invention.

FIG. 11 shows other embodiment of the shroud constituting the cooling system (cooling structure) according to the present invention. Pin insert holes 11i', 11i' are provided to a right and a left portions of a lower part of a front side plane 11a' of a shroud body 11' of a shroud 10'. Large-diameter attachment holes 12i', 12i' are each formed penetratingly to each of a left and a right portions of a lower part of a front side plane 12p' of an opening member 12' of the shroud 10'.

Additionally, in the shroud 10' described above, the opening member 12' is secured to the shroud body 11' by inserting a bolt 20' equipped with a washer 21' through an attachment hole 12h' of the opening member 12'; screwing the bolt 20' above to each nut 11n' of the shroud body 11' to fasten; inserting a tree pin 30 equipped with a washer 31 through the attachment hole 12h' of the opening member 12' to press-fit the tree pin 30 to each of the pin insert holes 11i' of the shroud body 11'; and, making the opening member 12' pressure-contacted with the shroud body 11'.

Figure 12:
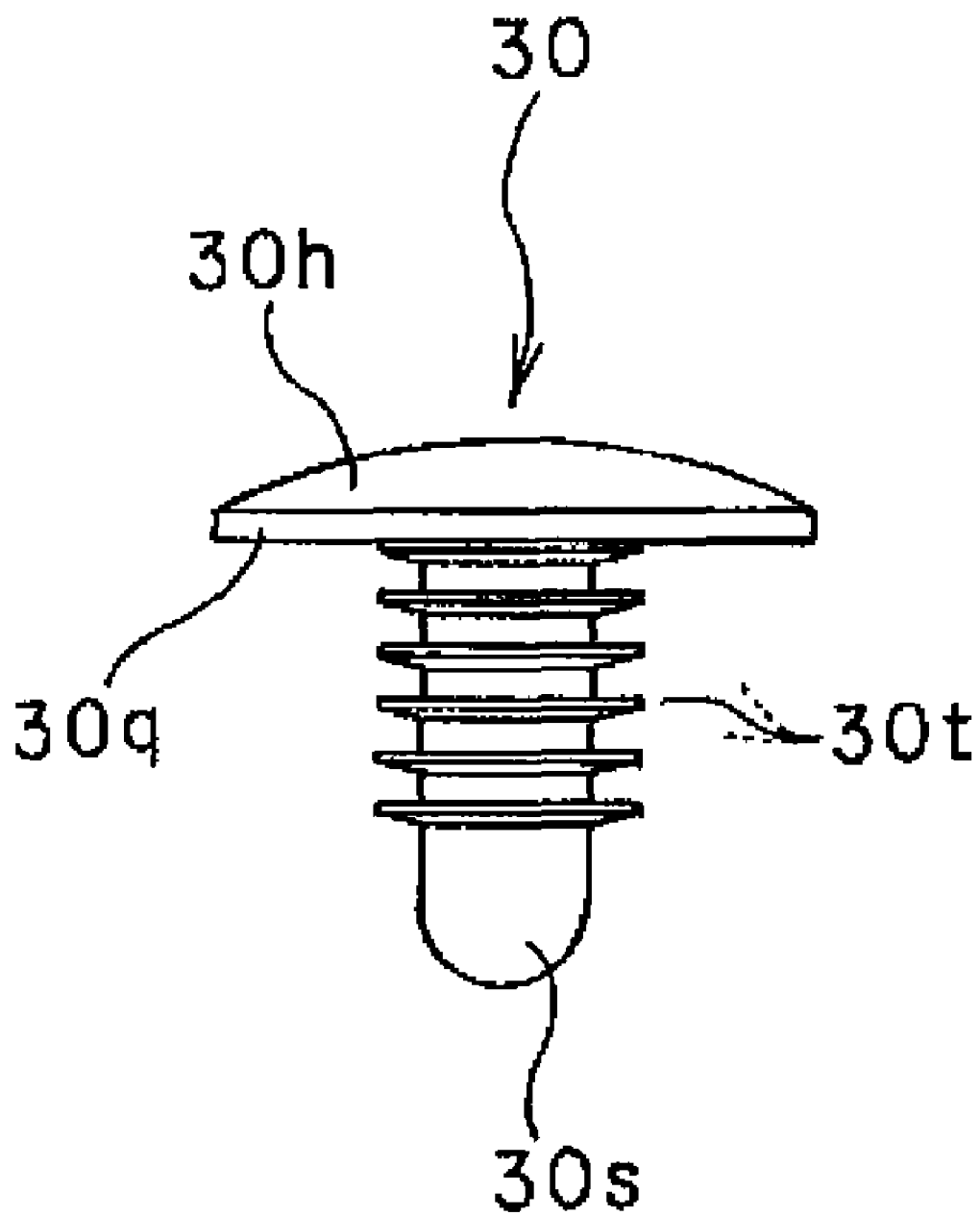
FIG. 12 is a side view of a tree clip used for assembling the shroud shown in FIG. 11.

Here, as shown in FIG. 12, the tree pin 30 above includes a head 30h having a cushion 30q at its bottom portion and a shaft potion 30s equipped with barbs 30t, and is formed, for example, of a plastic material having elasticity such as nylon. By press-fitting the shaft portion 30s of the tree pin 30, which is loosely fitted through the attachment hole 12i' of the opening member 12', into the pin insert hole 11i' of the shroud body 11', the opening member 12' is pressed with the head 30h of the tree pin 30 above.

It should be noted that the shroud 10' above has the same configuration as the shroud 10 shown in FIGS. 1-10 except that a securing mechanism comprising the tree pin 30 and the large-diameter attachment hole 12i' is employed in place of the securing mechanism in which the hook and the attachment tongue are combined. Additionally, the configuration of the shroud 10' is basically the same as the shroud 10 shown in FIGS. 1-10 except that the tree pin 30 has to be handled to adjust the position. Therefore, parts and components of the shroud 10' that provide the same operations as those of the shroud 10 are denoted in FIG. 11 with the same reference symbols as in FIGS. 1-10 by attaching a ' (dash), and the detail explanation thereof is omitted.

In the cooling system employing the shroud 10' having the configuration as described above, the position where the opening member 12' is fixed to the shroud body 11' is made freely adjustable. Thus, it is possible to obtain the sufficient amount of heat radiation by the radiator without causing disadvantages such as increased noise and deterioration in fuel efficiency, or to obtain other operation and effect similar to the cooling system employing the shroud 10 shown in FIGS. 1-10.

It should be noted that, in each of the embodiments described above, the forklift in which the engine is floatingly supported by the vehicle body is given as an example. However, it is understood that, even in a forklift in which the engine and the radiator are rigidly mounted to the vehicle body, employment of the cooling system according to the present invention is effective in canceling out the relative error in assembling the engine and the radiator.

Additionally, in each of the embodiments described above, description has been made of the cooling system in which heat from the radiator 5 is pushed out toward the rearward direction of the vehicle by the air-cooling fan 6 supported by the engine 4 as shown in FIGS. 1 and 2. However, the present invention may be effectively applied to a cooling system in which an air-cooling fan 6" is arranged in a rear of a radiator 5" as shown in FIG. 13, and the heat from the radiator 5" is drawn toward the rearward direction of the vehicle.

Figure 13:
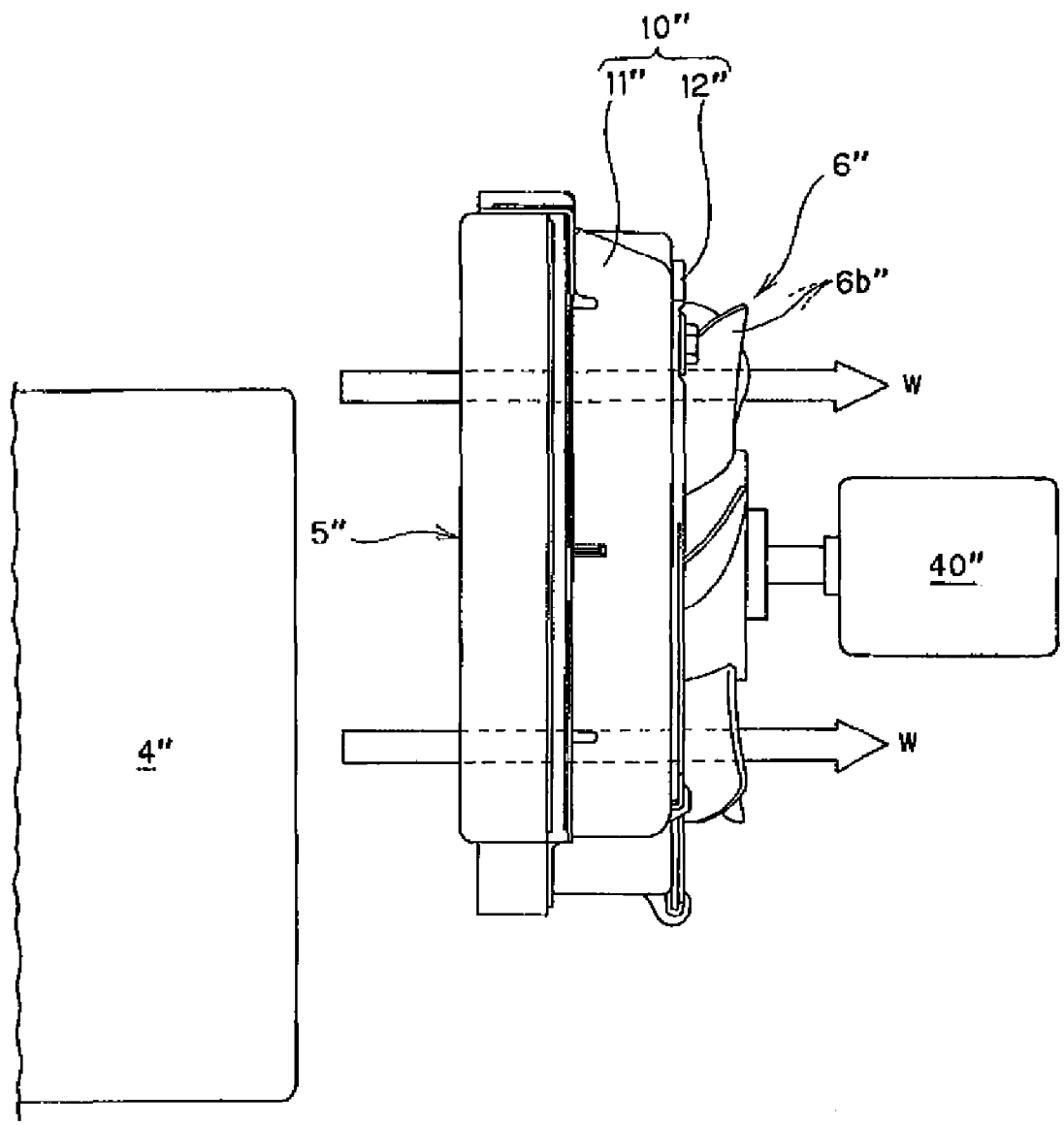
FIG. 13 is a main portion side view showing other embodiment of the cooling structure in the working vehicle according to the present invention.
Figure 14:
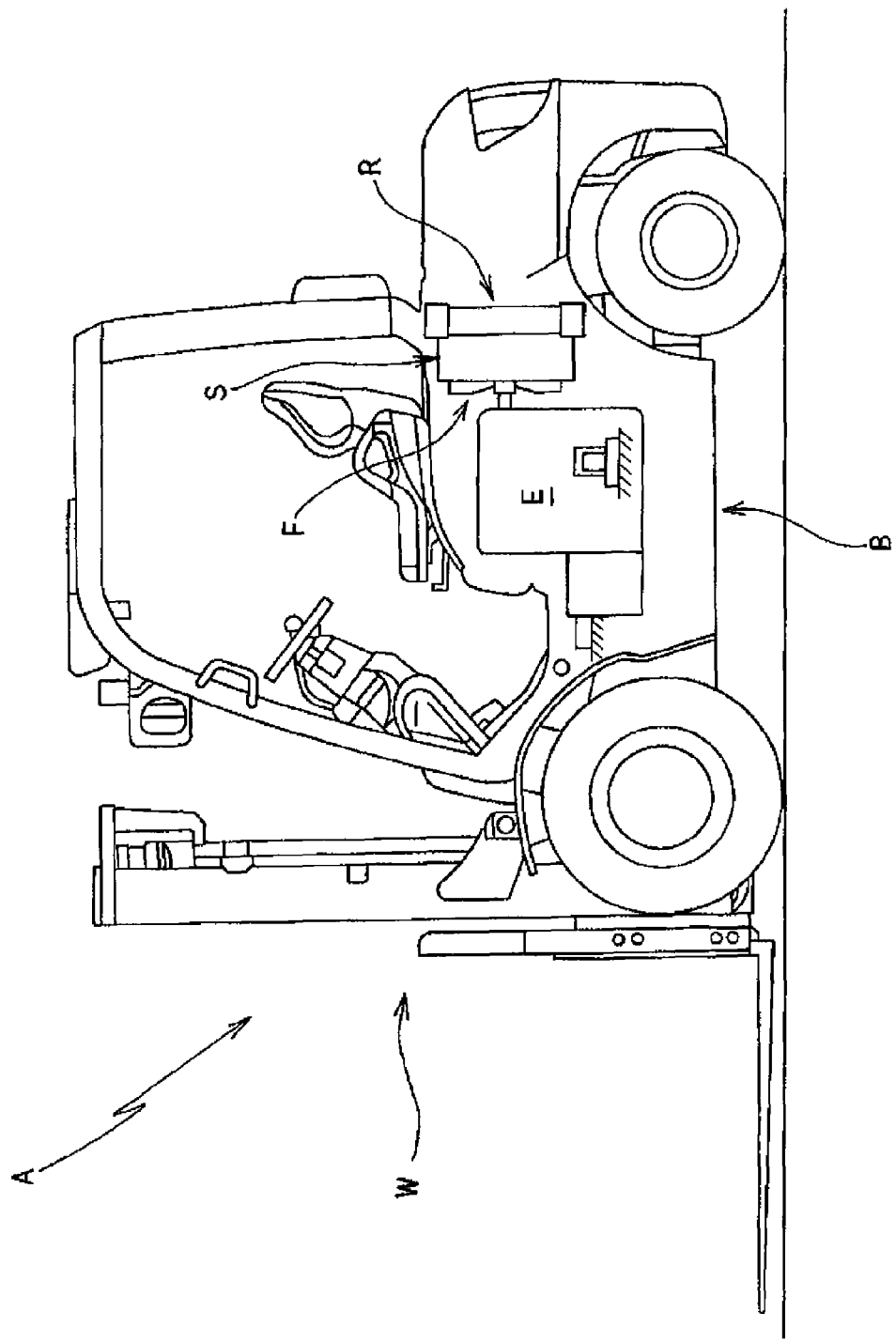
FIG. 14 is a conceptual view showing a layout of an engine, a radiator, etc. in the conventional working vehicle.
Figure 15:
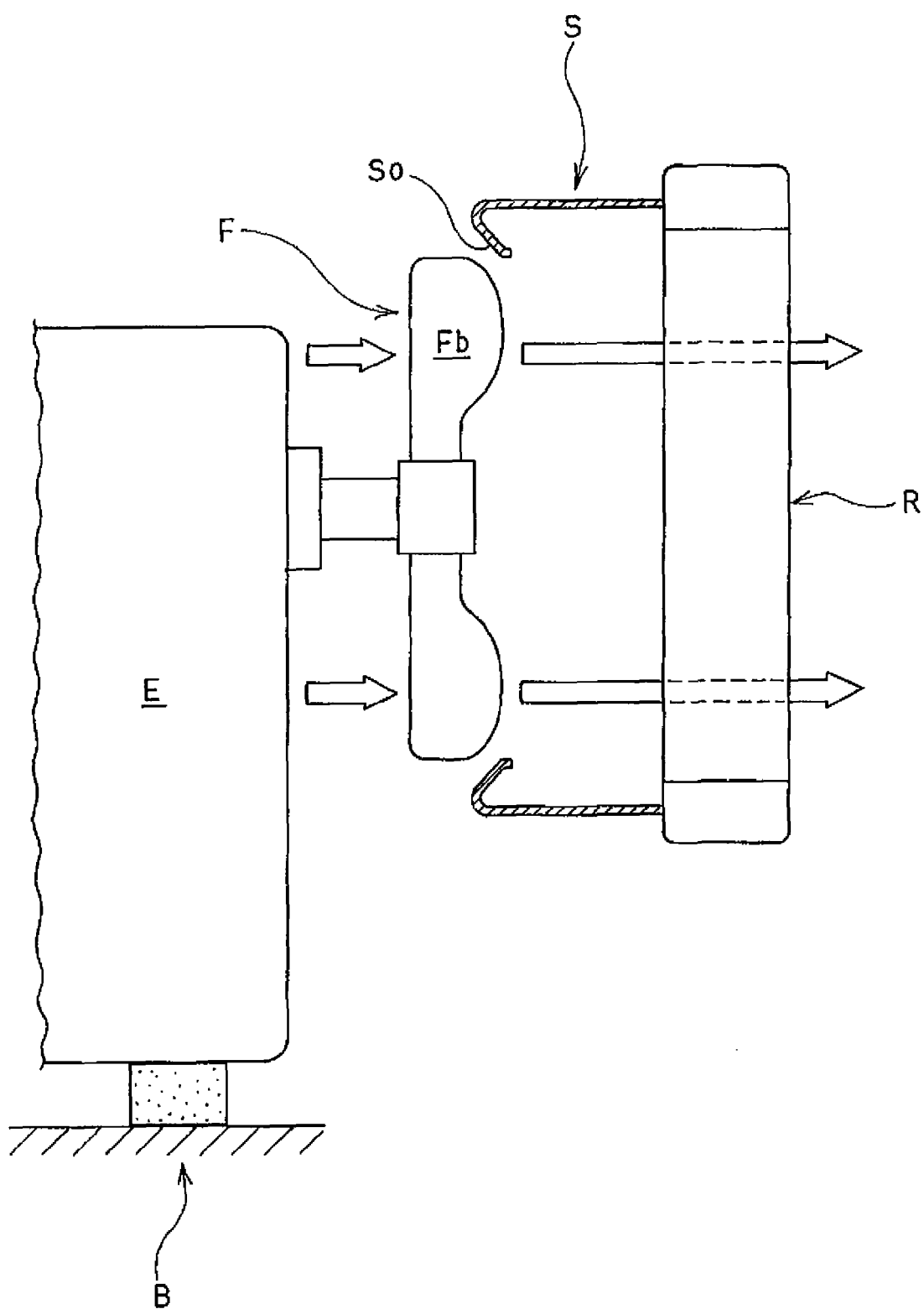
FIG. 15 is a main portion enlarged view showing a cooling structure in the conventional working vehicle.
Figure 16:
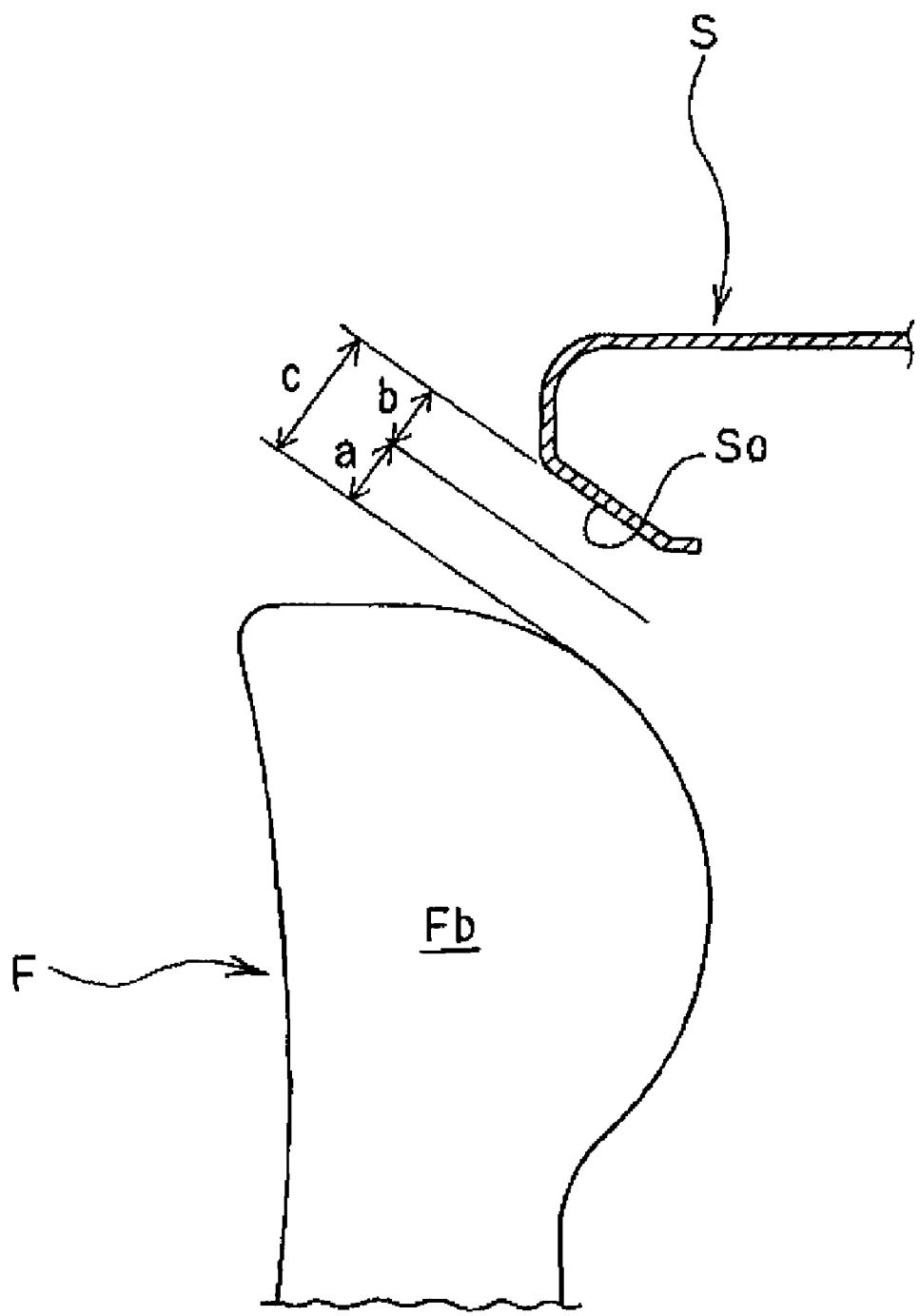
FIG. 16 is a main portion sectional view showing a positional relationship between a cooling fan and a shroud of the cooling structure in the conventional working vehicle.

In other words, in the cooling system shown in FIG. 13, a shroud 10" having a shroud body 11" and an opening member 12" is attached in a rear of the radiator 5" installed to a vehicle body (not shown) as is the case with an engine 4", and the air-cooling fan 6" driven by an electrically-driven motor (or hydraulic motor) 40" installed to the vehicle body (not shown) is arranged in a rear of the shroud 10".

The shroud 10" basically has the same configuration as the shroud 10 shown in FIGS. 1-10. The heat from the radiator 5" is drawn from the front side to the rear side as indicated by arrows w by the air-cooling fan 6" that is arranged so as to be made face to an airflow opening (for example, see reference numeral 12o in FIG. 3) of an opening member 12".

It is understood that, even in the cooling system having the configuration as described above, the present invention can be extremely effectively applied for the purpose of adjusting the relative position between the air-cooling fan 6" and the shroud 10", and optimizing the tip clearance between a fan blade 6b" of the air-cooling fan 6" and the airflow opening.

Additionally, in each of the embodiments described above, an example in which the present invention is applied to the cooling structure of the forklift, which is one mode of the working vehicle, is given. However, it is understood that the present invention can be extremely effectively applied to various working vehicles other than the forklift, provided that the vehicles have the cooling structure in which a shroud is attached to a radiator provided in a vehicle body; and an air-cooling fan for an engine provided in the vehicle body or the air-cooling fan provided separately from the engine is made face to the airflow opening formed to the shroud.

The invention claimed is:

1. A cooling structure for a working vehicle in which a shroud is attached to a radiator provided to a vehicle body, and an air-cooling fan is made face to an airflow opening of the shroud, wherein the shroud comprises a shroud body attached to the radiator, and an opening member having the airflow opening, and further comprises securing means capable of fixing the opening member to the shroud body, and of freely adjusting a fixing position of the opening member with respect to the shroud body, including a first securing mechanism, arranged to secure the opening member to the shroud, having a bolt screwed into the shroud body, and a large-diameter attachment hole formed to the opening member through which the bolt is loosely inserted; and a second securing mechanism, arranged to secure the opening member to the shroud, having an attachment tongue formed to one of the shroud body and the opening member, and a hook formed to the other one of the shroud body and the opening member to engage the attachment tongue, and a relative position between the air-cooling fan and the airflow opening of the shroud is made freely adjustable.

2. The cooling structure for a working vehicle according to claim 1, wherein the hook constituting the securing means is provided with a pressure protrusion that is pressure-contacted with the attachment tongue in a state where the attachment tongue is engaged with the hook.

3. The cooling structure for a working vehicle according to claim 1, wherein a strengthening rib is formed to the opening member to improve rigidity of the opening member.

* * * * *